US010898027B1

(12) United States Patent
Mishan et al.

(10) Patent No.: US 10,898,027 B1
(45) Date of Patent: Jan. 26, 2021

(54) PAIRED STACKABLE COOKWARE LIDS

(71) Applicant: E. MISHAN & SONS, INC., New York, NY (US)

(72) Inventors: Steven Mishan, New York, NY (US); Fred Hollinger, Monroe Township, NJ (US)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 16/891,070

(22) Filed: Jun. 3, 2020

Related U.S. Application Data

(60) Provisional application No. 63/007,081, filed on Apr. 8, 2020.

(51) Int. Cl.
*A47J 45/06* (2006.01)
*A47J 36/06* (2006.01)

(52) U.S. Cl.
CPC ............. *A47J 36/06* (2013.01); *A47J 45/063* (2013.01)

(58) Field of Classification Search
CPC .......... A47J 36/06; A47J 36/12; A47J 45/063; B65D 2543/00027; B65D 21/0233

USPC ....................................................... 206/508
See application file for complete search history.

(56) References Cited

U.S. PATENT DOCUMENTS

| | | | | |
|---|---|---|---|---|
| 10,486,857 | B2 * | 11/2019 | Gossens | A47J 27/002 |
| 2010/0230319 | A1 * | 9/2010 | Thomson | A47J 27/122 206/514 |
| 2020/0095018 | A1 * | 3/2020 | Truong | B65D 21/0217 |

* cited by examiner

*Primary Examiner* — Don M Anderson
(74) *Attorney, Agent, or Firm* — Notaro, Michalos & Zaccaria P.C.

(57) ABSTRACT

A paired set of cookware lids is configured to stack on each other and on cookware items. Each lid is configured to cover the other lid, with one lid in the upright position and the other in an inverted position, making it possible to stack both lids on one cookware container, with a first lid covering the container in the inverted position, and the second lid stacked on the first lid in the upright position. The lids are provided with multifunctional rims, having a flat annular shelf an outer rim extending in a perpendicular direction from the upper side of the annular shelf, and an inner rim extends in the opposite perpendicular direction from the lower side of the annular shelf.

27 Claims, 5 Drawing Sheets

PAIRED STACKABLE COOKWARE LIDS

CROSS REFERENCE TO RELATED APPLICATIONS

This application claims priority of U.S. Provisional Patent Application Ser. No. 63/007,081 filed Apr. 8, 2020, which is incorporated by reference for all purposes.

FIELD AND BACKGROUND OF THE SUBJECT TECHNOLOGY

The subject technology relates to household or commercial cookware vessels, for example, pots and pans, which may be used to cook food on a range top or in an oven.

SUMMARY OF THE SUBJECT TECHNOLOGY

According to an aspect of the subject technology, a paired set of cookware lids is provided. Each lid is configured to cover a cookware container, cookware item, or cookware vessel, for example a pot or pan, in an upright covering position, and additionally in an inverted covering position. Additionally, each lid is configured to cover the other lid, with one lid in the upright position and the other in an inverted position. Thus, it is possible to stack both lids on one cookware container, with a first lid covering the container in the inverted position, and the second lid stacked on the first lid in the upright position.

This versatility is achieved by providing the cookware lids with a multifunctional rim. According to an aspect of the subject technology, lid for a cookware item, for example a pot or a pan, comprises a body, a multifunctional rim, and preferably one or more handles. The lid has a first face and a second face. A handle may extend upwardly from the body or rim or may extend in the plane of the body or rim. A handle may be a grab handle (i.e. a C-shaped handle), a knob handle, a button handle, or any other lid handle known in the art.

In an embodiment, a lid has a glass body having a first face and a second face, a metal multifunctional rim, and a grab handle attached to and extending upwardly from the first face of the glass body.

In another embodiment, a lid has a glass body having a first face and a second face, a metal multifunctional rim, and two grab handles attached to and extending outwardly from the multifunctional rim, positioned on opposite sides of the rim.

In other embodiments, lids may have metal bodies with attached multifunctional rims. In other embodiments, lids may have metal bodies made as a single piece with multifunctional rims.

In an embodiment, a multifunctional rim is a circular metal hoop having a certain configuration. The multifunctional rim has a flat annular shelf having an outer circumferential edge and an inner circumferential edge. An outer rim extends in a perpendicular direction from the upper side of the annular shelf, at the outer circumferential edge. An inner rim extends in the opposite perpendicular direction from the lower side of the annular shelf, at the inner circumferential edge. The outer rim has a first outer diameter and a first inner diameter. The inner rim has a second outer diameter and a second inner diameter. It will be appreciated that the first inner diameter is greater than the second outer diameter, which in turn is greater than the second inner diameter.

In an embodiment, the glass or metal lid body is received in the multifunctional rim, within the first inner diameter of the outer rim, and contacting the annular shelf and the outer rim. Thus, the body is shaped and sized to fit snugly within the outer rim and in contact with the annular shelf. The outer rim may be formed with an inward lip or inwardly rolled edge around its circumference to retain the body in its position in the multifunctional rim.

According to an aspect of the subject technology, the lid and multifunctional rim are adapted to engage with and cover a cookware item, such as a pot or pan having a rim with an outer diameter and an inner diameter, in two positions: an upright position and an inverted position. The second outer diameter of the inner rim of the lid is smaller than the inner diameter of the cookware rim, so the lid can be placed on and cover the cookware item, in the upright position, with the inner rim positioned within the cookware rim, and the annular shelf resting on the cookware rim. The first inner diameter of the outer rim is larger than the outer diameter of the cookware rim, so the lid can be placed on and cover the cookware item, in the inverted position, with the outer rim positioned outside the cookware rim, and the annular shelf resting on the cookware rim.

According to a further aspect of the subject technology, a first lid and a second lid as described above are configured as a paired set. The lids may be identical in all respects except that the diameters of the respective inner rims are different. In an embodiment, the first lid has an inner rim with a second inner diameter which is slightly larger than the second outer diameter of the inner rim of the second lid. In this embodiment, the inner rim of the second lid fits inside the inner rim of the first lid, with a slight clearance between the respective inner rims. In various embodiments, the inner rim of the first lid has a second inner diameter that is 1 mm, 2 mm, 3 mm, 4 mm, 5 mm, or in the range of 1 mm to 5 mm, larger than the second outer diameter of the inner rim of the second lid.

The paired lids of the subject technology may be used and/or sold as part of a cookware set, including without limitation stackable cookware components and stackable cookware sets such as those disclosed in pending or issued U.S. patent application Ser. Nos. 16/245,814, 16/749,547, and 16/790,144, titled "Stackable and Nestable Cookware Having a Stable Configuration," Ser. No. 29/678,473 (now U.S. Pat. No. D880,233), Ser. No. 29/678,468 (now U.S. Pat. No. D880,221), Ser. No. 29/678,430 (now U.S. Pat. No. D879,545), Ser. No. 29/678,420 (now U.S. Pat. No. D880,222), Ser. Nos. 29/678,413, and 29/675,505 (now U.S. Pat. No. D879,546), Ser. Nos. 29/700,576 and 29/700,580, titled "Stackable Cookware," which are assigned to the applicant E. Mishan & Sons, Inc., and are incorporated herein in their entirety for all purposes.

DETAILED DESCRIPTION OF THE SUBJECT TECHNOLOGY

According to non-limiting aspects of the subject technology, the Figures show stackable cookware sets, stackable lids and their multifunctional rims.

Figure 1:
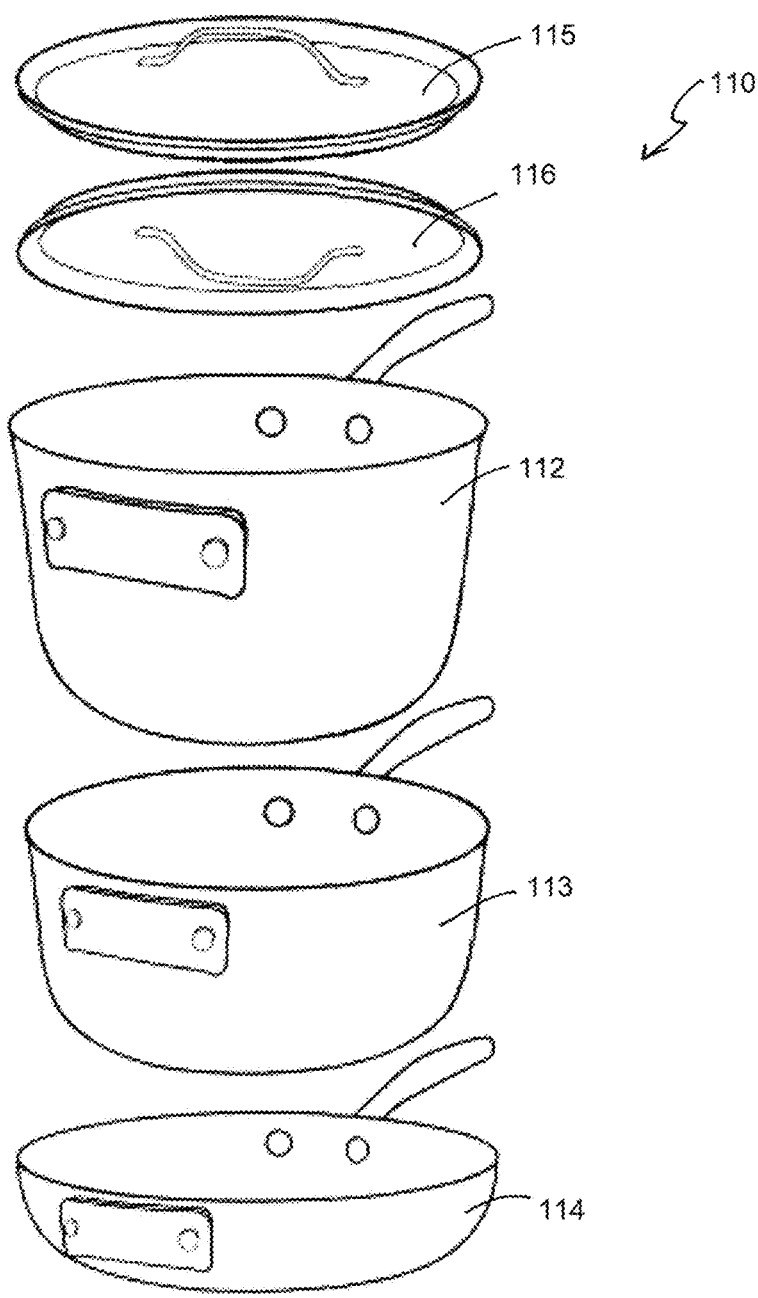
FIG. 1 is a top, front perspective view of a first exemplary embodiment of a cookware set including a set of paired lids.

FIG. 1 shows an embodiment of a cookware set 110 comprising pots 112, 113 and a frying pan 114, together with stackable, reversible lids 115, 116. In this embodiment, lids 115, 116 are adapted to be stacked on and cover any of the cookware 112, 113, 114 in an upright position (with the lower rim inside the rim of the cookware, and the lower surface of the annular shelf resting on the cookware rim) and in an inverted position (with the outer rim outside the rim of the cookware, and the upper surface of the annular shelf resting on the cookware rim). Additionally, lids 115 and 116 are mutually adapted to be stacked, with lid 115 or 116 in the upright position and the other lid 116 or 115 in the inverted position. Accordingly, the lower rim of lid 115 fits within the lower rim of lid 116; or alternatively, the lower rim of lid 116 fits within the lower rim of lid 115. In this embodiment, both lids 115 and 116 have C-shaped handles attached to one side of the lid body. When lid 115 or 116 is placed on a cookware item 112, 113, 114 in the inverted position, the C-shaped handle is within the cookware item.

Figure 2:
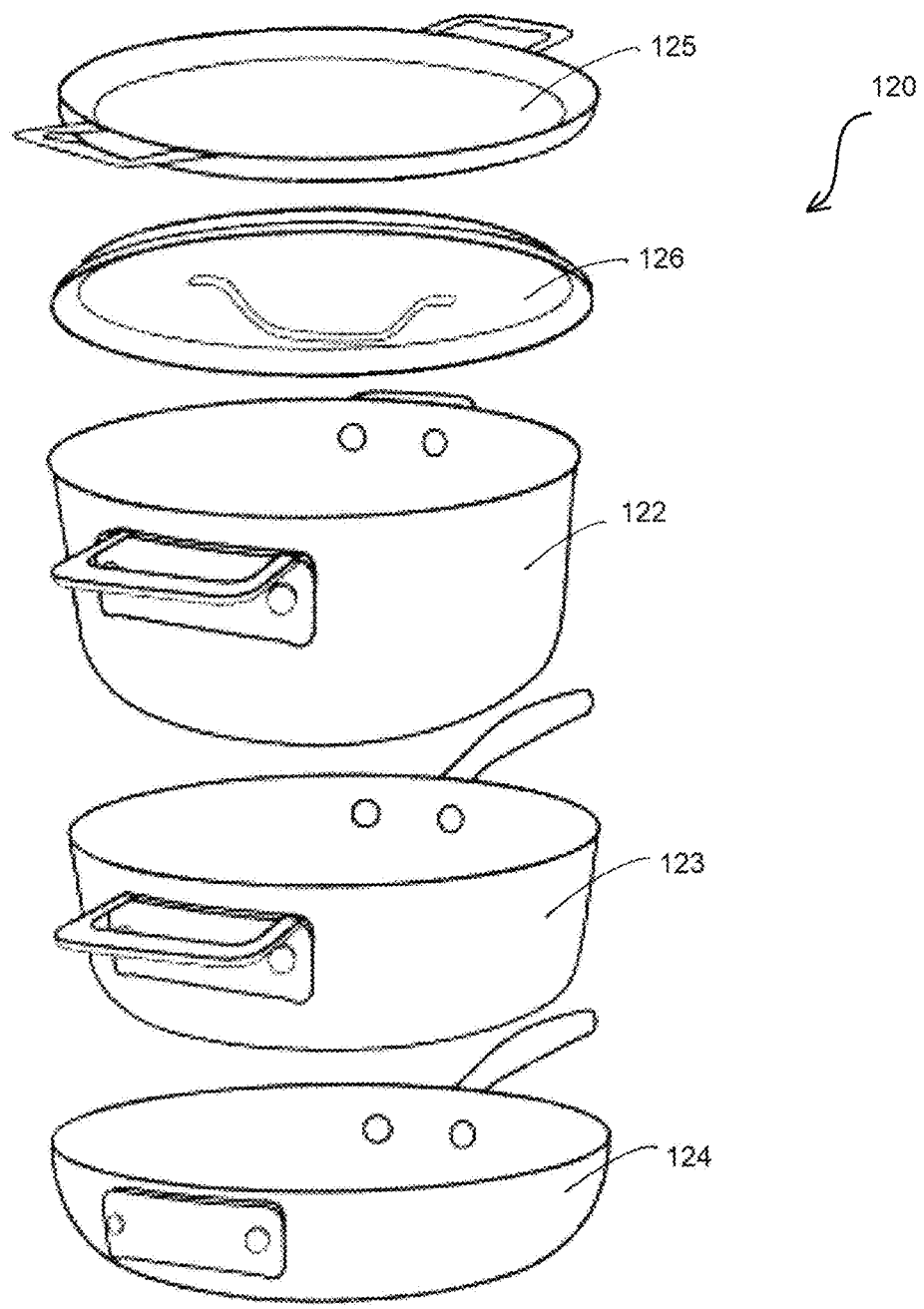
FIG. 2 is a top, front perspective view of a second exemplary embodiment of a cookware set including a set of paired lids.

FIG. 2 shows another embodiment of a cookware set 120 comprising pots 122, 123 and a frying pan 124, together with stackable, reversible lids 125, 126. As in the preceding embodiment, lids 125, 126 are adapted to be stacked on and cover any of the cookware 122, 123, 124 in an upright position (with the lower rim inside the rim of the cookware, and the lower surface of the annular shelf resting on the cookware rim) and in an inverted position (with the outer rim outside the rim of the cookware, and the upper surface of the annular shelf resting on the cookware rim). Additionally, lids 125 and 126 are mutually adapted to be stacked, with lid 125 or 126 in the upright position and the other lid 126 or 125 in the inverted position. Accordingly, the lower rim of lid 125 fits within the lower rim of lid 126; or alternatively, the lower rim of lid 126 fits within the lower rim of lid 125. In this embodiment, both lids 125 and 126 have C-shaped handles attached to one side of the lid body. When lid 125 or 126 is placed on a cookware item 122, 123, 124 in the inverted position, the C-shaped handle is within the cookware item.

Figure 3:
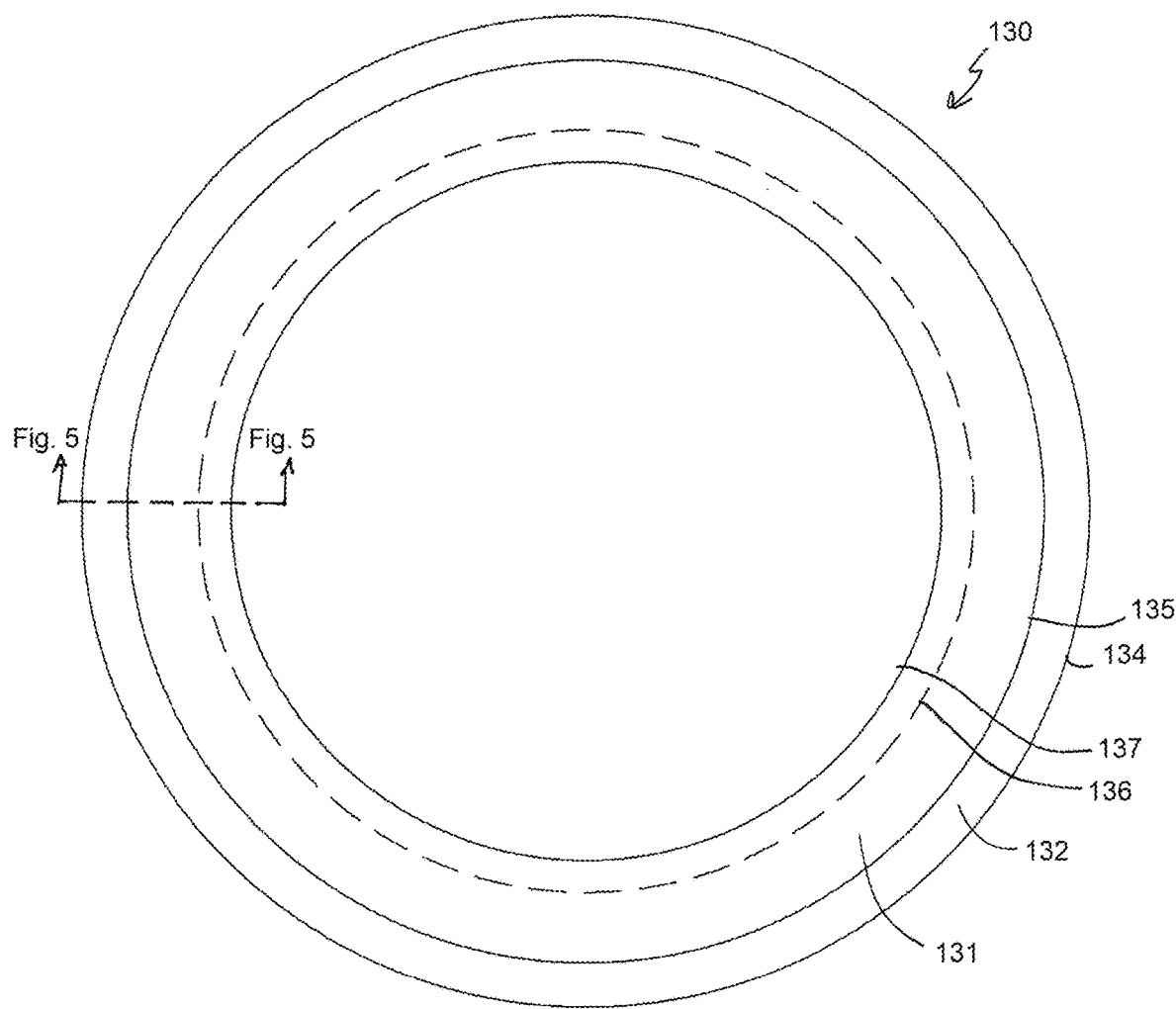
FIG. 3 is a schematic, not to scale, top, plan view of a multifunctional rim of a stackable cookware lid according to an exemplary embodiment of the subject technology.
Figure 4:
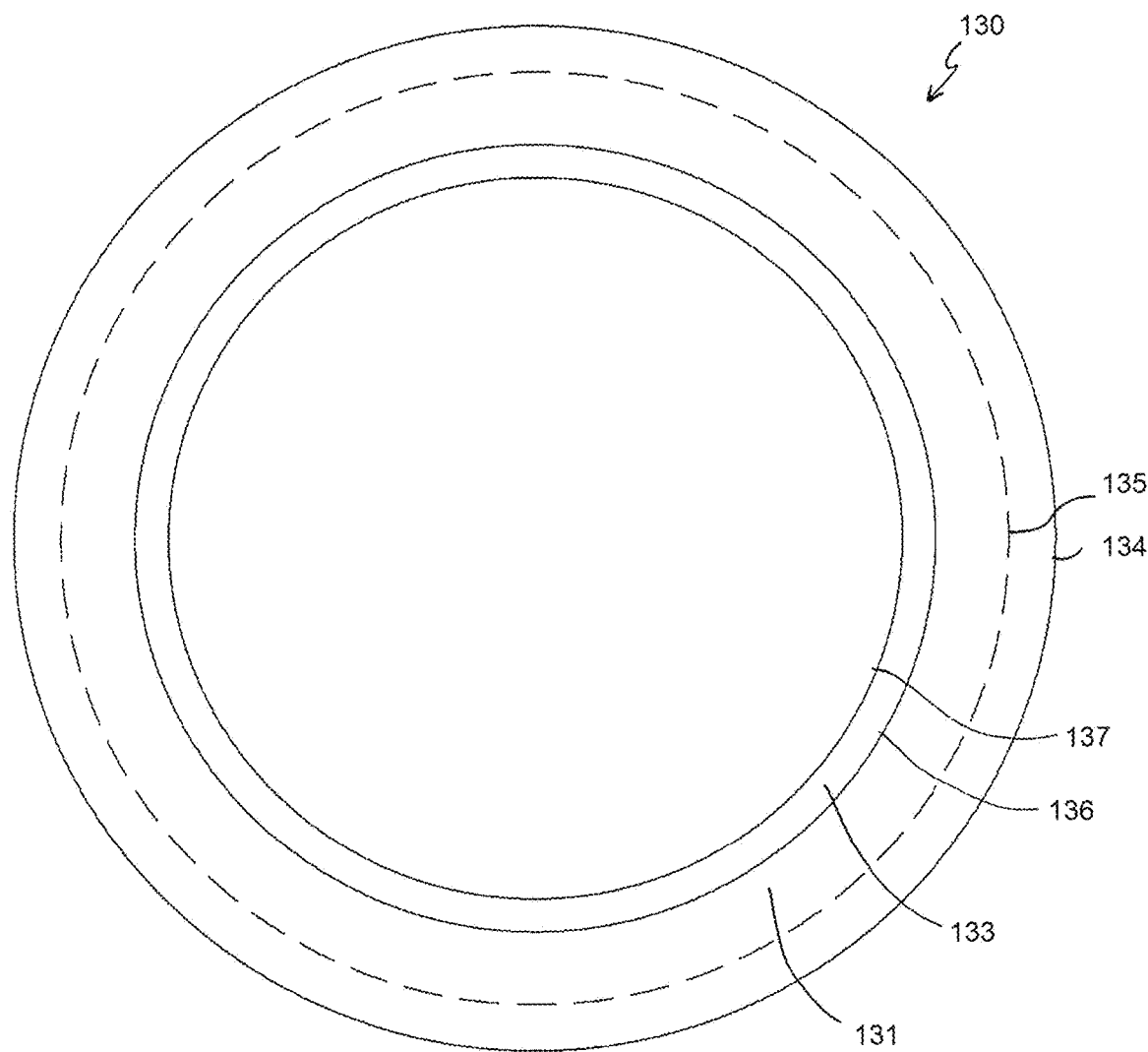
FIG. 4 is a schematic, not to scale, bottom, plan view of a multifunctional rim of a stackable cookware lid according to an exemplary embodiment of the subject technology.
Figure 5:
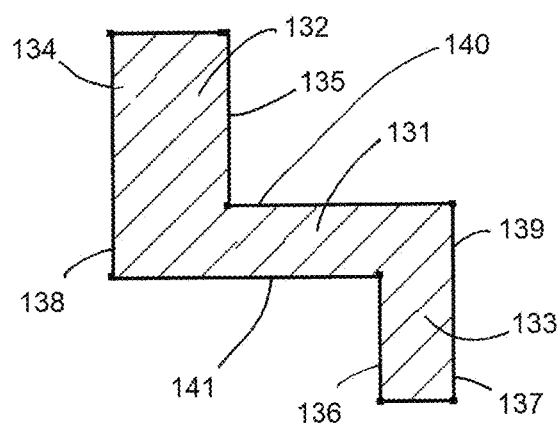
FIG. 5 is a schematic, not to scale, cross-sectional view of a multifunctional rim of a stackable cookware lid according to an exemplary embodiment of the subject technology.

FIGS. 3-5 are schematic, not-to-scale drawings of a multifunctional rim 130 of a lid according to an embodiment. Broken lines denote hidden lines in these figures. Multifunctional rim 130 is a circular metal hoop having a flat annular shelf 131, the shelf 131 having an outer circumferential edge 138 and an inner circumferential edge 139. Outer rim 132 extends from shelf 131 in a perpendicular direction, from the upper side 140 of the annular shelf, at the outer circumferential edge 138. Inner rim 133 extends from shelf 131 in the opposite perpendicular direction, from the lower side 141 of the annular shelf, at the inner circumferential edge 139. Outer rim 132 has a first outer diameter 134 and a first inner diameter 135. Inner rim 133 has a second outer diameter 136 and a second inner diameter 137. It will be appreciated that the first inner diameter 135 is greater than the second outer diameter 136, which in turn is greater than the second inner diameter 137.

A lid body, which may be flat or domed, is seated within first inner diameter 135 against shelf 131. The top edge of first inner diameter 135 may be formed to have an inward lip or rolled edge to retain the lid body in place.

A paired set of stackable lids according to an embodiment consists of two lids having multifunctional rims 130, which may be identical except that the second outer diameter 136 of one lid of the set is smaller than the second inner diameter 137 of the other pair. In various embodiments, the inner rim 132 of the first lid has a second inner diameter 137 that is 1 mm, 2 mm, 3 mm, 4 mm, 5 mm, or in the range of 1 mm to 5 mm, larger than the second outer diameter 136 of the inner rim of the second lid. Thus adapted, the lids can stack together, with the inner rim of one lid received within the inner rim of the other lid, and the inner rim of each lid contacting the lower surface of the annular shelf of the other lid.

FIGS. 6-16 are photographs of lids, stacked and paired lids, and stacks including a cookware item, to further disclose embodiments of the subject technology.

It should be understood that a cookware set of one or more cookware items and a paired set of lids as described herein is within the scope of the subject technology.

It should be understood that the ornamental appearance of the lids described herein is within the scope of the subject technology.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A paired set of lids for a cookware item with a rim, the rim having an inner diameter and an outer diameter, the paired set of lids comprising:
    a first lid and a second lid;
    each of the first lid and second lid comprising:
        a body having a circumference, and a rim around the circumference of the body, the rim comprising:
            an annular shelf;
            an outer rim extending from an upper side of the annular shelf and having a first outer diameter and a first inner diameter;
            an inner rim extending from a lower side of the annular shelf and having a second outer diameter and a second inner diameter, the second outer diameter less than the first inner diameter;
    wherein:
    the first inner diameter of both the first lid and second lid is greater than the outer diameter of the rim of the cookware item, such that the first lid and the second lid can each be placed on the rim of the cookware item with the outer rim positioned outside the rim of the cookware item;
    the second outer diameter of both the first and second lid is less than the inner diameter of the rim of the cookware item, such that the first lid and the second lid can each be placed on the rim of the cookware item with the inner rim positioned inside the rim of the cookware item; and
    the second inner diameter of the first lid is greater than the second outer diameter of the second lid, such that the first lid can be placed on the second lid with the inner rim of the first lid positioned outside the inner rim of the second lid.

2. The paired set of lids of claim 1 wherein the outer rim of the first lid or second lid is positioned at an outer circumferential edge of the annular shelf.

3. The paired set of lids of claim 1 wherein the inner rim of the first lid or second lid is positioned at an inner circumferential edge of the annular shelf.

4. The paired set of lids of claim 1 wherein the annular shelf of the first lid or second lid is flat.

5. The paired set of lids of claim 1 wherein the body of the first lid or second lid is a round glass plate retained on the upper surface of the annular shelf.

6. The paired set of lids of claim 1 wherein the outer rim of the first lid or second lid retains the body on the upper surface of the annular shelf.

7. The paired set of lids of claim 1 wherein the body of the first lid or second lid is a round metal plate retained on the upper surface of the annular shelf.

8. The paired set of lids of claim 1 wherein the body of the first lid or second lid is made as a single piece with the rim of the lid.

9. The paired set of lids of claim 1 wherein the first lid or second lid comprises a C-shaped handle.

10. The paired set of lids of claim 1 wherein the first lid or second lid comprises a C-shaped handle on the body of the lid.

11. The paired set of lids of claim 1 wherein the first lid or second lid comprises a C-shaped handle on the rim of the lid.

12. The paired set of lids of claim 1 wherein the first lid or second lid comprises two C-shaped handles on the rim of the lid disposed on opposite sides of the rim.

13. The paired set of lids of claim 1 wherein the first lid or second lid comprises a button handle or knob handle on the body of the lid.

14. The paired set of lids of claim 1 wherein the body of first lid or second lid is flat.

15. A cookware set comprising:
- a first cookware item having an upper rim;
- a first lid and a second lid, each of the first lid and second lid comprising:
  - a body having a circumference, and a rim around the circumference of the body, the rim comprising:
  - an annular shelf;
  - an outer rim extending from an upper side of the annular shelf and having a first outer diameter and a first inner diameter;
  - an inner rim extending from a lower side of the annular shelf and having a second outer diameter and a second inner diameter, the second outer diameter less than the first inner diameter;

wherein:
- the first inner diameter of both the first lid and second lid is greater than the outer diameter of the upper rim of the first cookware item, such that the first lid and the second lid can each be placed on the upper rim of the first cookware item with the outer rim of each of the first lid and second lid positioned outside the upper rim of the first cookware item;
- the second outer diameter of both the first and second lid is lesser than the inner diameter of the upper rim of the first cookware item, such that the first lid and the second lid can each be placed on the upper rim of the first cookware item with the inner rim of each of the first lid and second lid positioned inside the upper rim of the first cookware item; and
- the second inner diameter of the first lid is greater than the second outer diameter of the second lid, such that the first lid can be placed on the second lid with the inner rim of the first lid positioned outside the inner rim of the second lid.

16. The cookware set of claim 15 wherein the outer rim of the first lid or second lid is positioned at an outer circumferential edge of the annular shelf.

17. The cookware set of claim 15 wherein the inner rim of the first lid or second lid is positioned at an inner circumferential edge of the annular shelf.

18. The cookware set of claim 15 wherein the annular shelf of the first lid or second lid is flat.

19. The cookware set of claim 15 wherein the body of the first lid or second lid is a round glass plate retained on the upper surface of the annular shelf.

20. The cookware set of claim 15 wherein the outer rim of the first lid or second lid retains the body on the upper surface of the annular shelf.

21. The cookware set of claim 15 wherein the body of the first lid or second lid is a round metal plate retained on the upper surface of the annular shelf.

22. The cookware set of claim 15 wherein the body of the first lid or second lid is made as a single piece with the rim of the lid.

23. The cookware set of claim 15 wherein the first lid or second lid comprises a C-shaped handle.

24. The cookware set of claim 15 wherein the first lid or second lid comprises a C-shaped handle on the body of the lid.

25. The cookware set of claim 15 wherein the first lid or second lid comprises two C-shaped handles on the rim of the lid disposed on opposite sides of the rim.

26. The cookware set of claim 15 wherein the first lid or second lid comprises a button handle or knob handle on the body of the lid.

27. The cookware set of claim 15 wherein the body of first lid or second lid is flat.

* * * * *